(12) United States Patent
Noguchi et al.

(10) Patent No.: US 10,994,800 B2
(45) Date of Patent: May 4, 2021

(54) VEHICLE

(71) Applicant: HONDA MOTOR CO., LTD., Tokyo (JP)

(72) Inventors: Kohei Noguchi, Wako (JP); Kineo Tomura, Wako (JP); Shinichi Hosogoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 16/275,684

(22) Filed: Feb. 14, 2019

(65) Prior Publication Data
US 2019/0283835 A1 Sep. 19, 2019

(30) Foreign Application Priority Data
Mar. 16, 2018 (JP) .............................. JP2018-049917

(51) Int. Cl.
*B62K 25/08* (2006.01)
*B62L 1/00* (2006.01)
(Continued)

(52) U.S. Cl.
CPC ............ *B62K 25/08* (2013.01); *B60T 8/1706* (2013.01); *B62J 99/00* (2013.01); *B62L 1/00* (2013.01);
(Continued)

(58) Field of Classification Search
CPC .............. B62K 25/08; B62K 2025/044; B60G 2300/12; B62M 6/50; B62J 45/414;
(Continued)

(56) References Cited

U.S. PATENT DOCUMENTS 5,385,393 A * 1/1995 Tanaka .................. B60T 8/1706
303/150
5,539,640 A * 7/1996 Kishimoto .......... B60G 17/0165
701/40
(Continued)

FOREIGN PATENT DOCUMENTS

JP H07-315198 A 12/1995
JP H10-315733 12/1998
(Continued)

OTHER PUBLICATIONS

Indian Office Action dated May 20, 2020, 7 pages.
(Continued)

*Primary Examiner* — Paul N Dickson
*Assistant Examiner* — Timothy Wilhelm
(74) *Attorney, Agent, or Firm* — Rankin, Hill & Clark LLP

(57) ABSTRACT

A vehicle includes a suspension that supports a front wheel thereon, and a road surface state decision unit that decides a road surface state by detection of an acceleration sensor. The acceleration sensor is provided at a lower portion of the suspension and is capable of detecting an acceleration at least in a one-axis direction. The suspension is a front fork that supports the front wheel of the saddle riding vehicle. The front fork includes a bottom case that connects a lower portion of the front fork and an axle of the front wheel to each other. The acceleration sensor is attached to the bottom case.

8 Claims, 9 Drawing Sheets

(51) Int. Cl.
  *B60T 8/17* (2006.01)
  *B62J 99/00* (2020.01)
  *B62K 25/04* (2006.01)
  *B62J 45/40* (2020.01)

(52) U.S. Cl.
  CPC ............ *B60T 2210/14* (2013.01); *B62J 45/40* (2020.02); *B62K 2025/044* (2013.01)

(58) Field of Classification Search
  CPC .......... B62J 45/423; B62J 45/40; B62J 99/00; B62L 1/00; B60T 8/1706; B60T 2210/14
  See application file for complete search history.

(56) References Cited

U.S. PATENT DOCUMENTS

| | | | | |
|---|---|---|---|---|
| 6,050,583 A * | 4/2000 | Bohn | ...................... | B62K 25/04 188/282.4 |
| 6,202,802 B1 * | 3/2001 | Nakamura | ................ | B60T 5/00 188/24.11 |
| 6,543,799 B2 * | 4/2003 | Miyoshi | ................. | B62K 25/04 280/283 |
| 6,595,537 B2 * | 7/2003 | Miyoshi | ................. | B62K 25/04 188/282.4 |
| 7,322,437 B2 * | 1/2008 | Toyoda | .................... | B62J 99/00 180/219 |
| 7,395,167 B2 * | 7/2008 | Frolik | ................. | G01M 13/028 702/113 |
| 7,658,256 B2 * | 2/2010 | Kobayashi | .......... | B60R 21/0132 180/274 |
| 7,661,771 B2 * | 2/2010 | Nimura | ................. | B62K 25/08 303/137 |
| 7,901,013 B2 * | 3/2011 | Ishida | ...................... | B62J 99/00 303/168 |
| 8,237,431 B2 * | 8/2012 | Fruehling | ........... | F16C 33/7859 324/207.25 |
| 8,560,173 B2 * | 10/2013 | Matsuda | ................ | B60G 17/08 701/38 |
| 8,770,357 B2 * | 7/2014 | Sims | ...................... | B60G 17/08 188/267.1 |
| 8,844,944 B1 * | 9/2014 | Murakami | ......... | B60G 17/0165 280/5.514 |
| 9,145,028 B2 * | 9/2015 | Mori | ..................... | B60T 8/1706 |
| 9,244,090 B2 * | 1/2016 | Boro | ....................... | G01P 3/487 |
| 9,358,853 B2 * | 6/2016 | Ishikawa | .............. | B60G 17/016 |
| 9,422,993 B2 * | 8/2016 | Watarai | ................. | F16D 65/847 |
| 9,428,242 B2 * | 8/2016 | Ginther | ................. | B62K 25/04 |
| 9,539,857 B2 * | 1/2017 | Sagane | ................. | F16C 35/067 |
| 9,809,276 B2 * | 11/2017 | Katsura | ................. | B62M 9/132 |
| 9,855,811 B2 * | 1/2018 | Murakami | ............ | B60G 17/08 |
| 9,863,973 B2 * | 1/2018 | Kato | ....................... | B62J 99/00 |
| 9,890,826 B2 * | 2/2018 | Staahl | ..................... | F16D 66/00 |
| 9,902,380 B2 * | 2/2018 | Nozawa | ................ | B60W 10/18 |
| 10,047,817 B2 * | 8/2018 | Ericksen | .......... | B60G 17/01908 |
| 10,099,743 B2 * | 10/2018 | Walthert | .................. | F16F 9/535 |
| 10,500,897 B2 * | 12/2019 | Ono | ......................... | B62J 99/00 |
| 10,532,623 B2 * | 1/2020 | Ono | .................... | B60G 17/0164 |
| 10,556,463 B2 * | 2/2020 | Neutsch | ................ | B60B 27/023 |
| 10,578,179 B2 * | 3/2020 | Laird | .................... | F16F 9/0245 |
| 10,618,367 B2 * | 4/2020 | Awano | ................ | B60G 17/0164 |
| 2009/0192673 A1 | 7/2009 | Song et al. | | |
| 2012/0065825 A1 * | 3/2012 | Nicoson | ................. | B62K 11/04 701/22 |
| 2015/0127240 A1 * | 5/2015 | Nozawa | ................ | B60W 10/06 701/82 |
| 2016/0311415 A1 | 10/2016 | Oshima et al. | | |
| 2019/0001779 A1 * | 1/2019 | Cheng | .................... | B60G 17/08 |
| 2019/0092116 A1 * | 3/2019 | Magnus | ................ | G01D 5/2412 |
| 2019/0127016 A1 * | 5/2019 | Murakami | ................ | F16F 9/56 |
| 2019/0176834 A1 * | 6/2019 | Kanbayashi | .......... | B60C 23/064 |
| 2019/0184782 A1 * | 6/2019 | Shaw | ..................... | B60G 17/06 |

FOREIGN PATENT DOCUMENTS

| | | |
|---|---|---|
| JP | 2006-248296 | 9/2006 |
| JP | 2007-69699 A | 3/2007 |
| JP | 2009-067161 | 4/2009 |
| JP | 5617314 B2 | 11/2014 |
| JP | 2019-011038 | 1/2019 |

OTHER PUBLICATIONS

European Search Report dated Sep. 5, 2019, 7 pages.
Japanese Office Action dated Nov. 19, 2019, English translation included, 9 pages.
Japanese Office Action with English translation dated Mar. 17, 2020, 9 pages.

* cited by examiner

VEHICLE

INCORPORATION BY REFERENCE

The present application claims priority under 35 U.S.C. § 119 to Japanese Patent Application No. 2018-049917 filed on Mar. 16, 2018. The content of the application is incorporated herein by reference in its entirety.

TECHNICAL FIELD

The present invention relates to a vehicle.

BACKGROUND ART

Conventionally, a vehicle is known in which a state of a road surface is decided by an acceleration sensor mounted on the vehicle and a characteristic of a suspension is adjusted on the basis of a result of the decision (for example, refer to Patent Document 1).

PRIOR ART DOCUMENT

Patent Document

Patent Document 1
Japanese Patent Laid-Open No. Hei 10-315733

SUMMARY OF THE INVENTION

Problem to be Solved by the Invention

Incidentally, it is desired in such a conventional vehicle in which a state of a road surface is decided as described above to make it possible to decide a state of a road surface with a simple structure and with high accuracy.

The present invention has been made in view of such a situation as described above, and it is an object of the present invention to make it possible for a vehicle to decide a state of a road surface with a simple structure and high accuracy.

Means for Solving the Problem

According to a first aspect of the present invention, there is provided a vehicle including a suspension (18) that supports a front wheel (2) thereon, and a road surface state decision unit (62) that decides a road surface state by detection of a sensor (50), in which the sensor (50) is provided at a lower portion of the suspension (18) and is capable of detecting an acceleration at least in a one-axis direction; the suspension (18) is a front fork (18) that supports the front wheel (2) of the vehicle that is a saddle riding vehicle (1); the front fork (18) includes a bottom case (30) that connects a lower portion of the front fork (18) and an axle (2a) of the front wheel (2) to each other; and the sensor (50) is attached to the bottom case (30).

The vehicle may be configured such that the road surface state decision unit (62) decides a road surface state based on a detection value in an extension direction of the suspension (18).

According to a second aspect of the present disclosure, there is provided a vehicle including a suspension (18) that supports a wheel (2) at a lower portion thereof, and a road surface state decision unit (62) that decides a road surface state by detection of a sensor (50), in which the sensor (50) is provided at the lower portion of the suspension (18) and is capable of detecting an acceleration at least in a one-axis direction; and the road surface state decision unit (62) decides a road surface state based on a detection value in an extension direction of the suspension (18).

The vehicle may be configured such that a brake caliper attachment hole (43c) to which a brake caliper (37) for braking the wheel (2) is attached is provided in the bottom case (30), and the sensor (50) is fastened to the brake caliper attachment hole (43c) together with the brake caliper (37).

Further, the vehicle may be configured such that the sensor (50) is disposed between an axle (2a) of the wheel (2) and the brake caliper (37) as viewed in side elevation of the vehicle.

Further, the vehicle may be configured such that the road surface state decision unit (62) is capable of deciding a hard road surface (H) and a soft road surface (S) that is softer in road surface state than the hard road surface (H), and the road surface state decision unit (62) decides that the road surface state is the hard road surface (H) taking it as a trigger that a variation time period ($\Delta AB$) after an acceleration reaches a first threshold value (A) until the acceleration reaches a second threshold value (B) that is lower than the first threshold value (A) is within a given time period.

Further, the vehicle may be configured such that the road surface state decision unit (62) decides that the road surface state is the soft road surface (S) taking it as a trigger that the variation time period ($\Delta AB$) is longer than the given time period.

Further, the vehicle may be configured such that, where it is decided that the road surface state is the soft road surface (S), the road surface state decision unit (62) transits to a temporary mode (I) if the trigger of the hard road surface (H) is detected; if the trigger of the hard road surface (H) is detected within a second given time period (p2) after the transition to the temporary mode (I), then the road surface state decision unit (62) decides that the road surface state is the hard road surface (H), but if the trigger of the hard road surface (H) is not detected within the second given time period (p2) after the transition to the temporary mode (I), then the road surface state decision unit (62) decides that the road surface state is the soft road surface (S); and, in the temporary mode (I), the road surface state decision unit (62) decides that the road surface state is the hard road surface (H).

Furthermore, the vehicle may be configured such that, if a third given time period (p3) elapses after the trigger of the hard road surface (H) is detected, then the road surface state decision unit (62) decides that the road surface state is the soft road surface (S).

Further, the vehicle may be configured such that, where it is decided that the road surface state is the hard road surface (H), every time the trigger of the hard road surface (H) is detected, the road surface state decision unit (62) resets a count of a timer and starts counting of the timer, and if the count of the timer reaches a given value, then the road surface state decision unit (62) decides that the road surface state is the soft road surface (S).

Effects of the Invention

With the vehicle according to the first aspect of the present invention, it includes a suspension that supports a front wheel thereon, and a road surface state decision unit that decides a road surface state by detection of a sensor. The sensor is provided at a lower portion of the suspension and is capable of detecting an acceleration at least in a one-axis direction. The suspension is a front fork that supports the front wheel of the vehicle that is a saddle riding vehicle. The front fork includes a bottom case that connects a lower portion of the front fork and an axle of the front wheel to each other. The sensor is attached to the bottom case.

According to the configuration just described, since the sensor for detecting the acceleration is attached to the bottom case of the front fork of the saddle riding vehicle, the sensor can be provided in a simple structure and the acceleration acting on the front wheel can be detected effectively. Further, the road surface state decision unit can decide a state of the road surface with high accuracy from a detection value of the acceleration.

The road surface state decision unit may decide a road surface state based on a detection value in an extension direction of the suspension. Since, in the extension direction of the suspension, the variation amount of the damping force with respect to a stroke of the suspension is greater than that in the compression direction of the suspension, the road surface state can be decided with high accuracy by deciding the road surface state from the acceleration in the extension direction.

Meanwhile, with the vehicle according to the second aspect of the present invention, it includes a suspension that supports a wheel at a lower portion thereof, and a road surface state decision unit that decides a road surface state by detection of a sensor. The sensor is provided at the lower portion of the suspension and is capable of detecting an acceleration at least in a one-axis direction. The road surface state decision unit decides a road surface state based on a detection value in an extension direction of the suspension.

With the configuration described above, since the sensor is attached to the lower portion of the suspension, the sensor can be provided in a simple structure and an acceleration acting on the front wheel can be detected effectively. Further, the road surface state decision unit can decide a state of the road surface with high accuracy from the detection value of the acceleration. Further, since, in the extension direction of the suspension, the variation amount of the damping force with respect to a stroke of the suspension is greater than that in the compression direction of the suspension, the road surface state can be decided with high accuracy by deciding the road surface state from the acceleration in the extension direction.

Further, in the vehicle, a brake caliper attachment hole to which a brake caliper for braking the wheel is attached may be provided in the bottom case, and the sensor may be fastened to the brake caliper attachment hole together with the brake caliper. With the configuration just described, a fixture for exclusive use for attachment of the sensor can be omitted and the number of parts can be reduced.

Furthermore, in the vehicle, the sensor may be disposed between an axle of the wheel and the brake caliper as viewed in side elevation of the vehicle. With the configuration just described, the sensor can be provided compactly utilizing a space between the axle and the brake caliper and the sensor can be prevented from standing out, and therefore, the appearance performance is good.

Further, in the vehicle, the road surface state decision unit may be capable of deciding a hard road surface and a soft road surface that is softer in road surface state than the hard road surface. Further, the road surface state decision unit may decide that the road surface state is the hard road surface taking it as a trigger that a variation time period after an acceleration reaches a first threshold value until the acceleration reaches a second threshold value that is lower than the first threshold value is within a given time period.

With the configuration just described, the hard road surface can be decided with high accuracy on the basis of a time period until after the acceleration decreases from the first threshold value to the second threshold value.

Further, in the vehicle, the road surface state decision unit may decide that the road surface state is the soft road surface taking it as a trigger that the variation time period is longer than the given time period.

With the configuration described above, the soft road surface can be decided with high accuracy on the basis of a time period until after the acceleration decreases from the first threshold value to the second threshold value.

Further, in the vehicle, where it is decided that the road surface state is the soft road surface, the road surface state decision unit may transit to a temporary mode if the trigger of the hard road surface is detected. Then, if the trigger of the hard road surface is detected within a second given time period after the transition to the temporary mode, then the road surface state decision unit may decide that the road surface state is the hard road surface, but if the trigger of the hard road surface is not detected within the second given time period after the transition to the temporary mode, then the road surface state decision unit may decide that the road surface state is the soft road surface. Further, in the temporary mode, the road surface state decision unit may decide that the road surface state is the hard road surface.

With the configuration described above, if the trigger of the hard road surface is detected, then since the road surface state decision unit transits to the temporary mode and decides that the road surface state is the hard road surface, the road surface state decision unit can quickly transit from the decision of the soft road surface to the decision of the hard road surface. On the other hand, if the trigger of the hard road surface is not detected within the second given time period after migration to the temporary mode, then since the road surface state decision unit quickly returns to the decision of the soft road surface, the road surface state decision unit can return to the decision of the soft road surface in response to the actual road surface state.

Furthermore, in the he vehicle, if a third given time period elapses after the trigger of the hard road surface is detected, then the road surface state decision unit may decide that the road surface state is the soft road surface. With the configuration just described, the road surface state decision unit can quickly return from the decision of the hard road surface to the decision of the soft road surface, and where the actual road surface state is the soft road surface, transition to the decision of the hard road surface is suppressed.

Further, in the vehicle, where it is decided that the road surface state is the hard road surface, every time the trigger of the hard road surface is detected, the road surface state decision unit may reset a count of a timer and starts counting of the timer, and if the count of the timer reaches a given value, then the road surface state decision unit may decide that the road surface state is the soft road surface.

With the configuration just described, since the decision of the hard road surface is maintained until after the count of the timer reaches the given value, the decision of the hard road surface can be maintained appropriately. Further, if the count of the timer reaches a given value, then since it is decided that the road surface state is the soft road surface, the road surface state decision unit can quickly return from the decision of the hard road surface to the decision of the soft road surface.

MODES FOR CARRYING OUT THE INVENTION

Figure 1:
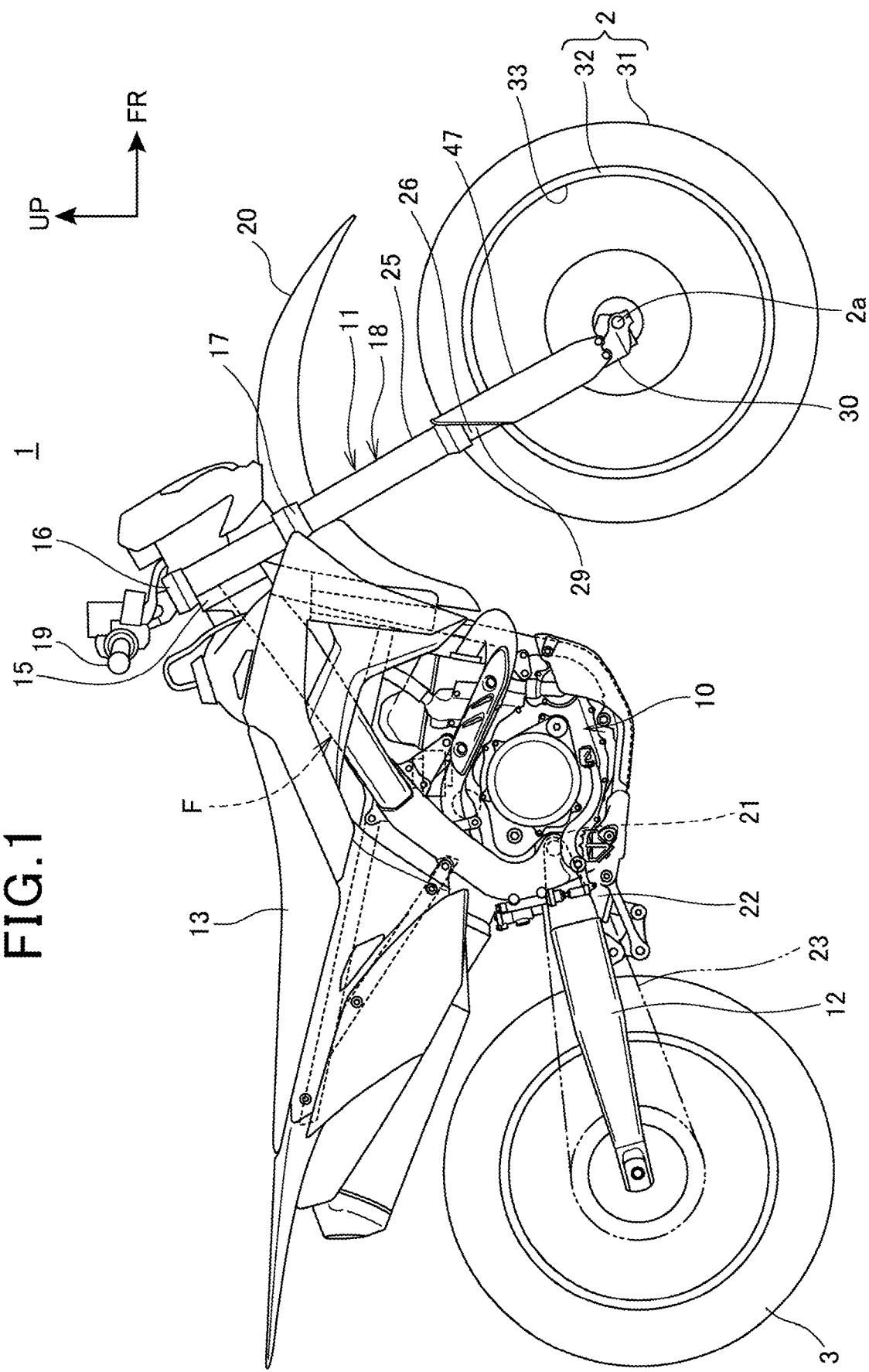
FIG. 1 is a right side elevational view of a motorcycle according to a first embodiment of the present invention.

In the following, embodiments of the present invention are described with reference to the drawings. It is to be noted that, unless otherwise specified, directions such as forward, rearward, leftward, rightward, upward and downward directions in the following description are same as those of a vehicle body described below. Further, reference character FR depicted in the drawings indicates the forward direction of the vehicle body, reference character UP indicates the upward direction of the vehicle body, and reference character LH indicates the leftward direction of the vehicle body.

First Embodiment

FIG. 1 is a right side elevational view of a motorcycle 1 according to a first embodiment of the present invention. It is to be noted that, in FIG. 1, where elements are provided in left and right pair, only an element on the right side is depicted including a reference character therefor.

The motorcycle 1 is a vehicle in which an engine 10 as a power unit is supported on a vehicle body frame F, and a steering system 11 for supporting a front wheel 2 (vehicle wheel) for steering movement is supported for steering movement at a front end of the vehicle body frame F and a swing arm 12 that supports a rear wheel 3 is provided at a rear portion of the vehicle body frame F.

The motorcycle 1 is a saddle riding vehicle in which a seat 13 on which the driver is to be seated astride is provided above a rear portion of the vehicle body frame F.

The steering system 11 is supported on a head pipe 15 provided at a front end of the vehicle body frame F.

The steering system 11 includes a steering shaft (not depicted) supported for rotation on the head pipe 15, a top bridge 16 fixed to an upper end of the steering shaft, a bottom bridge 17 fixed to a lower end of the steering shaft, and a front fork having front forks 18 (suspensions) disposed in pair on the left and right sides of the head pipe 15 and supported on the top bridge 16 and the bottom bridge 17.

An axle 2a is supported at a lower end portion of the front forks 18 provided in pair on the left and right sides. The front wheel 2 is disposed between the left and right front forks 18 and is supported on the axle 2a.

A handlebar 19 that is used for steering of the front wheel 2 by the driver is attached to the top bridge 16.

A front fender 20 is attached to the bottom bridge 17 such that it covers the front wheel 2 from above.

The swing arm 12 is supported at a front end portion thereof on a pivot shaft 21 provided at a rear portion of the vehicle body frame F such that the swing arm 12 rocks upwardly and downwardly around the pivot shaft 21.

A rear suspension 22 is stretched between the front end of the swing arm 12 and the vehicle body frame F.

Driving force of the engine 10 is transmitted to the rear wheel 3 through a chain 23.

Figure 2:
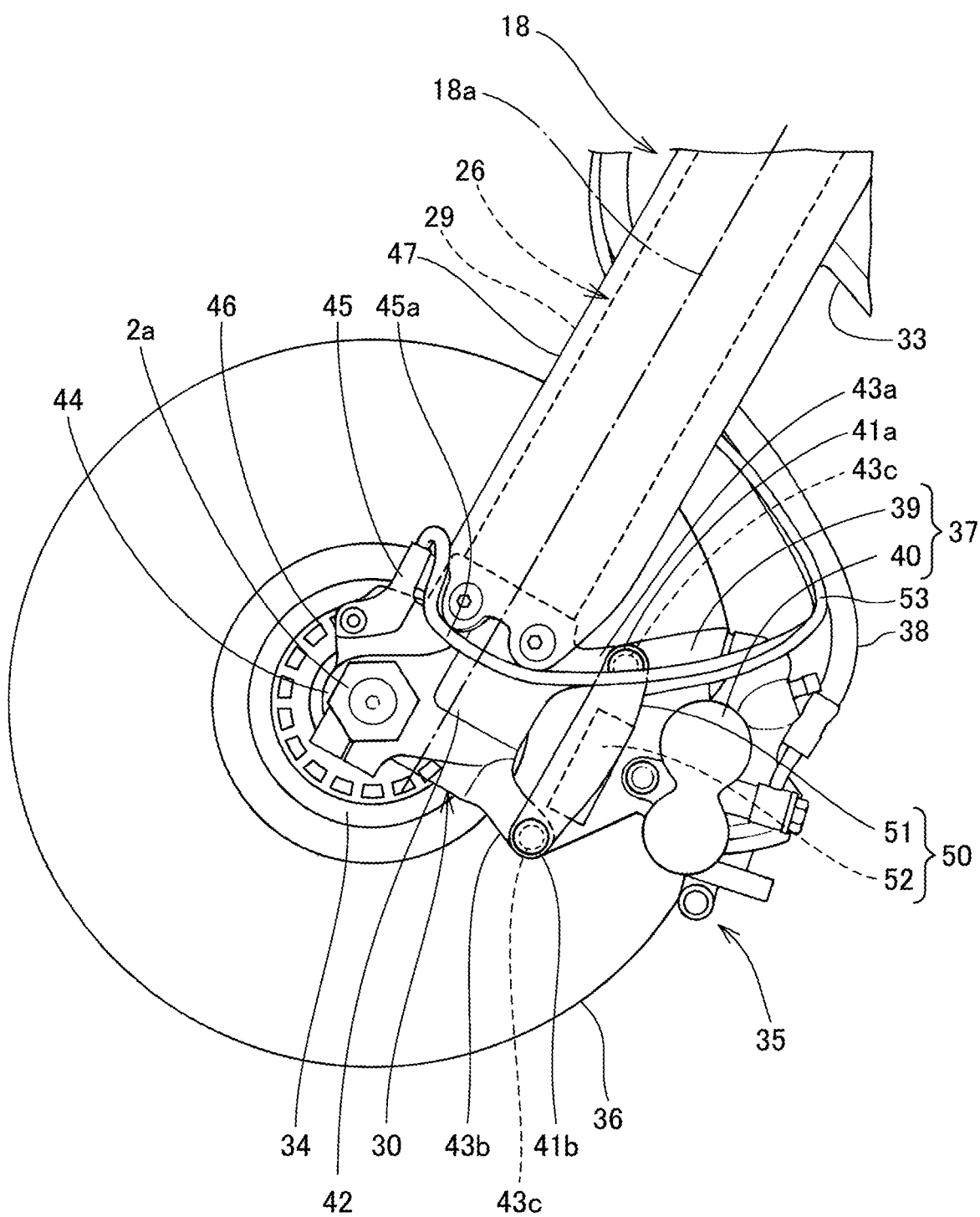
FIG. 2 is a left side elevational view of peripheral elements of a lower portion of a front fork.
Figure 3:
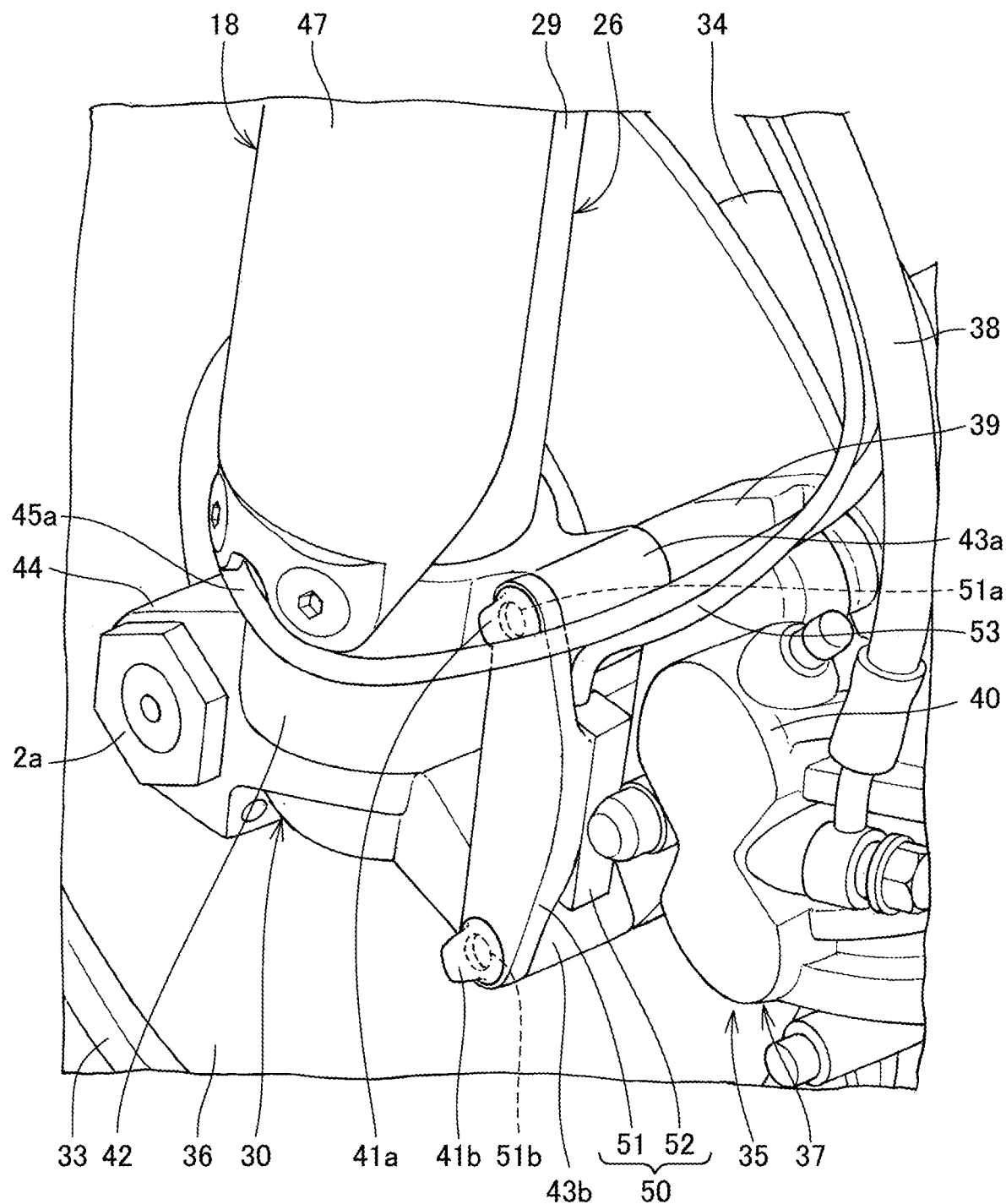
FIG. 3 is a perspective view of the lower portion of a front fork on the left side as viewed from the rear side.

FIG. 2 is a left side elevational view of peripheral elements of a lower portion of the front fork 18. FIG. 3 is a perspective view of the lower portion of the left side front fork 18 of the front fork as viewed from the rear side.

Referring to FIGS. 1 to 3, the front forks 18 are disposed in a posture inclined rearwardly with respect to the vertical direction as viewed in side elevation of the vehicle.

Each of the front forks 18 of the front fork includes a fixed tube 25 fixed to the top bridge 16 and the bottom bridge 17, a movable tube 26 that strokes in an axial direction with respect to the fixing tube 25, a coil spring (not depicted) that is provided in the tube and is compressed in a stroke direction of the front fork 18, a damping force generation unit (not depicted), and a suspension adjustment mechanism 27 (FIG. 4) that adjusts a behavior characteristic of the front fork 18.

The front fork 18 is a telescopic suspension in which the movable tube 26 strokes in an axial direction with respect to the fixed tube 25.

The coil spring described above biases the front fork 18 in its extension direction and absorbs a shock from the road surface.

The damping force generation unit damps vibration of the front fork 18 in its contraction direction and extension direction. The damping force generation unit damps the stroke (vibration) of the front fork 18 by the resistance of the hydraulic oil in the front fork 18.

The suspension adjustment mechanism 27 is driven by an actuator and can change the initial load of the coil spring of the front fork 18 and the damping force of the front fork 18.

The movable tube 26 includes a tube main body 29 that fits from below and slidably moves in the fixed tube 25, and a bottom case 30 coupled to a lower end portion of the tube main body 29.

The front wheel 2 is disposed between the left and right bottom cases 30. The front wheel 2 is supported for rotation on the axle 2a extending between the left and right bottom cases 30.

The front wheel 2 includes a tire 31 and a wheel 32 to which the tire 31 is attached.

The wheel 32 includes an annular rim 33 to which the tire 31 is attached, a hub 34 supported for rotation on the axle 2a, and spokes (not depicted) that connect the hub 34 and the rim 33 to each other.

The hub 34 is formed in a circular shape as viewed in side elevation and has, at the center thereof, an axle hole in which the axle 2a is fitted.

The spokes extend radially to the diametrically outer sides from an outer circumference of the hub 34 and are coupled to an inner circumference of the rim 33.

The motorcycle 1 includes a front brake system 35 for braking the front wheel 2.

The front brake system 35 includes a brake disk 36 that rotates together with the front wheel 2, a brake caliper 37 that sandwiches and presses the brake disk 36 under hydraulic pressure to brake the front wheel 2, and a brake hose 38 that supplies hydraulic pressure to the brake caliper 37 therethrough.

The brake disk 36 is disposed coaxially with the axle 2a and fixed to the hub 34. The brake disk 36 is disposed between the left side front fork 18 and the wheel 32 in the vehicle widthwise direction.

The brake caliper 37 is fixed to the left side bottom case 30.

The brake caliper 37 is disposed behind the axle 2a and the bottom case 30 as viewed in side elevation of the vehicle.

The brake caliper 37 includes a caliper supporting member 39 fixed to the bottom case 30, and a caliper main body 40 that sandwiches and presses the brake disk 36 through a brake pad (not detected).

The brake caliper 37 is fixed to the bottom case 30 by caliper fixation bolts 41a and 41b that are screwed at an upper portion and a lower portion of a front portion of the caliper supporting member 39, respectively.

The caliper main body 40 is supported at a rear portion of the caliper supporting member 39. The brake hose 38 is led out from a rear portion of the caliper main body 40 and extends upwardly.

The bottom case 30 includes a bottom case main body 42 coupled to a lower end portion of the tube main body 29, and caliper stays 43a and 43b extending rearwardly from a rear face of the bottom case main body 42.

The bottom case main body 42 has, at a lower portion of a front portion thereof as viewed in side elevation of the vehicle, an axle supporting hole 44 that supports the axle 2a.

A wheel speed sensor 45 is attached to an upper portion of a front portion of the bottom case main body 42. The wheel speed sensor 45 detects rotation of the front wheel 2 by detecting a ring-shaped pulser rotor 46 attached to the hub 34.

Figure 4:
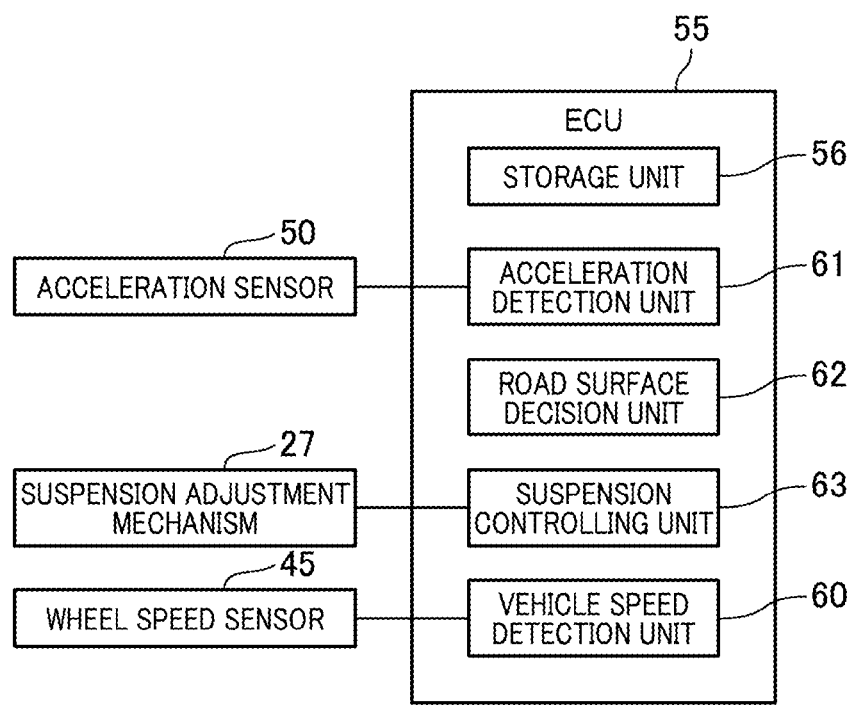
FIG. 4 is a block diagram of a configuration that decides a road surface state from an acceleration.

The axle 2a and the wheel speed sensor 45 are positioned forwardly of the axial line 18a of the front fork 18. A cable 45a of the wheel speed sensor 45 extends rearwardly along an outer side face of the bottom case main body 42 and routed upwardly along the brake hose 38. The cable 45a is connected to a control unit 55 (FIG. 4).

A fork cover 47 is fastened at a lower end portion thereof to an upper portion of the bottom case main body 42. The fork cover 47 covers the tube main body 29 from the front and from the sides.

The caliper stays 43a and 43b are provided in pair on the upper and lower sides, respectively. The caliper stay 43a on the upper side extends rearwardly from an upper end portion of a rear face of the bottom case main body 42. The caliper stay 43b on the lower side extends rearwardly downwards from a lower end portion of the rear face of the bottom case main body 42.

At a rear end portion of the caliper stays 43a and 43b, attachment holes 43c (brake caliper attachment holes) are provided which extend in the vehicle widthwise direction through the caliper stays 43a and 43b.

The caliper stays 43a and 43b are positioned rearwardly of the axial line 18a of the front fork 18.

The caliper supporting member 39 is fastened to inner side faces in the vehicle widthwise direction of the caliper stays 43a and 43b by the caliper fixation bolts 41a and 41b fitted from the outer sides in the vehicle widthwise direction in the attachment holes 43c of the caliper stays 43a and 43b.

The motorcycle 1 includes an acceleration sensor 50 (sensor) for detecting the acceleration acting on the motorcycle 1. The acceleration sensor 50 is attached to the bottom case 30 of the movable tube 26 of the left side front fork 18.

When the motorcycle 1 runs on the road surface, the front forks 18 stroke in response to a road surface condition such as recesses and projections or the like of the road surface, a movement of the center of gravity or the like caused by acceleration and deceleration of the motorcycle 1.

In particular, in each front fork 18, the movable tube 26 strokes in an axial direction of the axial line 18a together with the front wheel 2 with respect to the fixed tube 25 fixed to the vehicle body side.

The acceleration sensor 50 attached to the bottom case 30 of the movable tube 26 moves integrally with the movable tube 26 and detects an acceleration when the movable tube 26 strokes.

Here, the acceleration sensor 50 is capable of detecting an acceleration in a one-axis direction and detects an acceleration of a stroke in the axial direction of the front fork 18. However, the acceleration sensor is sufficient if it can detect an acceleration in at least a one-axis direction and may be capable of detecting accelerations in a plurality of directions.

The acceleration sensor 50 includes a bracket portion 51 fixed to the bottom case 30, and a sensor main body portion 52 having a device for detecting an acceleration.

The bracket portion 51 is a plate-shaped member elongated upwardly and downwardly as viewed in side elevation of the vehicle and is fixed to the caliper stays 43a and 43b. At an upper end portion of the bracket portion 51, a fixation hole 51a is provided such that the caliper fixation bolt 41a on the upper side is fitted in the fixation hole 51a. At a lower end of the bracket portion 51, a fixation hole 51b is provided such that the caliper fixation bolt 41b on the lower side is fitted in the fixation hole 51b.

The sensor main body portion 52 is fixed to an inner side face in the vehicle widthwise direction of the bracket portion 51 and is disposed, in the vehicle widthwise direction, between the bracket portion 51 and the caliper supporting member 39. Further, the sensor main body portion 52 is positioned, in the upward and downward direction, between the caliper stay 43a on the upper side and the caliper stay 43b on the lower side.

A harness 53 led out from an upper portion of the sensor main body portion 52 extends rearwardly upwards toward the brake hose 38 side and is laid toward the vehicle body side above along the brake hose 38.

The acceleration sensor 50 is fastened, at the bracket portion 51 thereof disposed on an outer side face in the vehicle widthwise direction of the caliper stays 43a and 43b, to the caliper stays 43a and 43b by the caliper fixation bolts 41a and 41b fitted in the fixation holes 51a and 51b from the outer side in the vehicle widthwise direction.

In particular, the acceleration sensor 50 is fastened to the caliper stays 43a and 43b together with the brake caliper 37 by the caliper fixation bolts 41a and 41b.

In side elevation of the vehicle, the acceleration sensor 50 is positioned rearwardly of the axle 2a but forwardly of the caliper main body 40 and is disposed between the axle 2a and the caliper main body 40.

The motorcycle 1 detects the acceleration of the stroke of the front forks 18 by the acceleration sensor 50 and decides the road surface condition of the road surface on which the motorcycle 1 runs from a result of the detection.

FIG. 4 is a block diagram of a configuration for deciding the road surface condition from an acceleration.

The motorcycle 1 includes a control unit 55 that controls the components of the motorcycle 1 such as the engine 10. The control unit 55 is an electronic control unit (ECU) and is attached to the vehicle body.

The control unit 55 includes an arithmetic operation unit (not depicted) and a storage unit 56. The arithmetic operation unit is a processor such as a CPU. The control unit 55 executes a program stored in the storage unit 56 to perform control of the engine 10 and so forth and decision of the road surface state. The storage unit 56 is a nonvolatile storage device such as a flash ROM or an EEPROM and stores a program to be executed by the arithmetic operation unit and data and so forth to be processed by the arithmetic operation unit.

To the control unit 55, the acceleration sensor 50 is connected through the harness 53. Further, to the control unit 55, the suspension adjustment mechanism 27 and the wheel speed sensor 45 are connected.

Various functional units the control unit 55 has are formed by cooperation with software and hardware when the arithmetic operation unit executes a program.

The control unit 55 includes such functional units as a vehicle speed detection unit 60, an acceleration detection unit 61, a road surface decision unit 62 (road surface state decision means) and a suspension controlling unit 63.

A vehicle speed detection unit 60 detects a vehicle speed of the motorcycle 1 on the basis of detection information of the wheel speed sensor 45.

The acceleration detection unit 61 detects an acceleration of a stroke of the movable tube 26 of the front fork 18 on the basis of detection information of the acceleration sensor 50.

The road surface decision unit 62 performs a process for road surface state decision control for deciding a road surface state from an acceleration of a stroke of the front fork 18.

The suspension controlling unit 63 controls the suspension adjustment mechanism 27 on the basis of the vehicle speed of the motorcycle 1 and information of the road surface state and so forth to adjust the behavior characteristic of the front forks 18.

Figure 5:
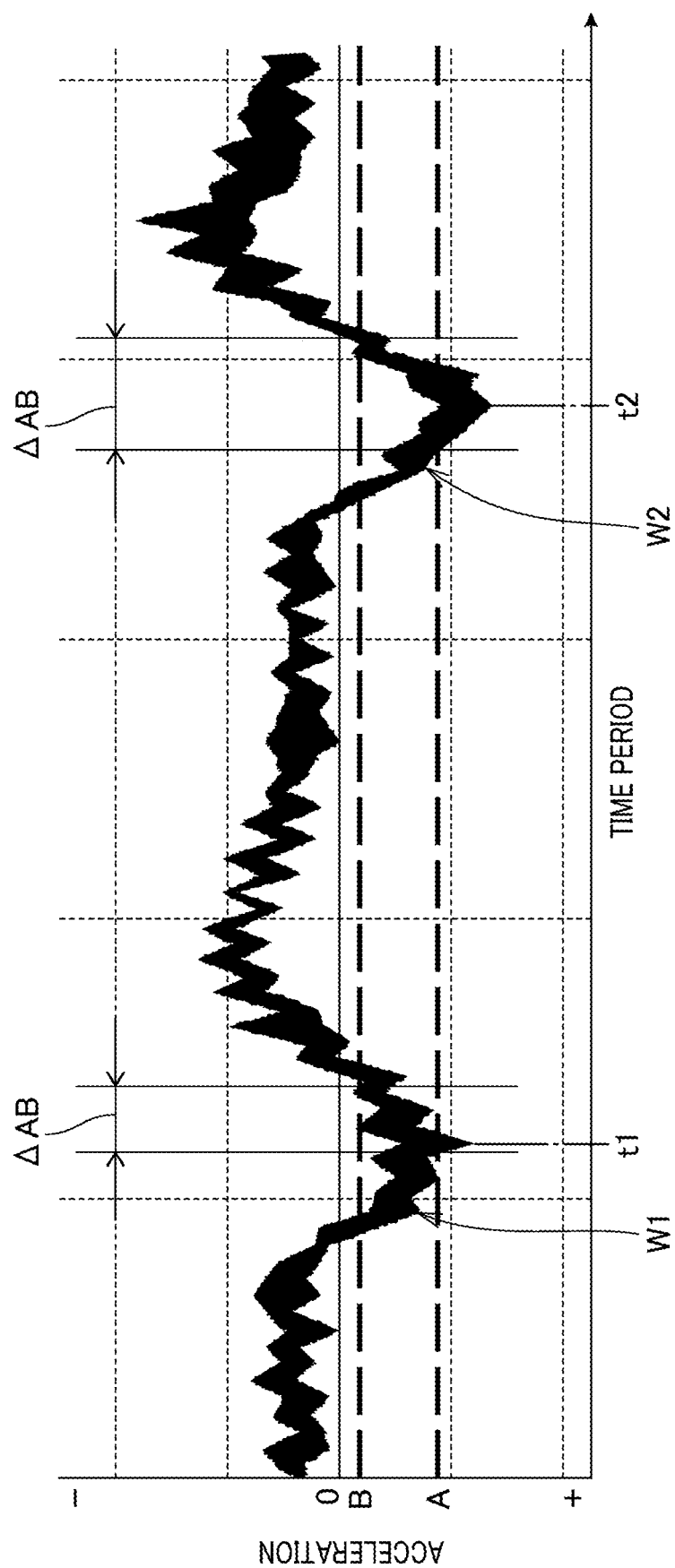
FIG. 5 is a view depicting a waveform of an acceleration detected by an acceleration sensor.

FIG. 5 is a view depicting a waveform of the acceleration detected by the acceleration sensor 50. In FIG. 5, time is indicated by the axis of abscissa, and the acceleration is indicated by the axis of ordinate.

In FIG. 5, upon running of the motorcycle 1, a waveform W1 and another waveform W2 of accelerations when the front forks 18 are extended after compressed are indicated in the proximity of time t1 and in the proximity of time t2, respectively. The waveform W1 and the waveform W2 in FIG. 5 project downwardly from the proximity of a base line.

In the waveform W1, the acceleration indicates a maximum value at time t1. A portion of the waveform W1 before time t1 indicates an acceleration in a state in which the front forks 18 are compressed. A portion of the waveform W1 after time t2 indicates an acceleration in a state in which the front forks 18 are extended.

In the waveform W2, the acceleration indicates a maximum value at time t2. A portion of the waveform W2 before time t2 indicates an acceleration in a state in which the front forks 18 are compressed. A portion of the waveform W2 after time t2 indicates an acceleration in a state in which the front forks 18 are extended.

It is to be noted that, while, in FIG. 5, in regard to the acceleration, the positive direction of the axis of ordinate is a compression direction and the negative direction of the axis of ordinate is an elongation direction, the present invention is not limited to this. For example, the acceleration sensor 50 may be attached in the reverse direction to that in the case of FIG. 5 such that the positive direction of the axis of ordinate indicates an elongation direction and the negative direction of the axis of ordinate indicates a compression direction.

The road surface decision unit 62 uses, for the decision of a road surface state, a first threshold value A of the acceleration, a second threshold value B of the acceleration and a variation time period $\Delta AB$ are used.

The first threshold value A is a threshold value set for the acceleration when the front forks 18 are compressed. Therefore, in the waveform W1, the acceleration reaches the first threshold value A before time 51, but in the waveform W2, the acceleration reaches the first threshold value A before time t2.

The second threshold value B is a threshold value set for the acceleration when the front forks 18 are extended after they are compressed. Therefore, in the waveform W1, the acceleration reaches the second threshold value B after time t1, but in the waveform W2, the acceleration reaches the second threshold value B after time t2. The second threshold value B is a value lower than the first threshold value A.

The variation time period $\Delta AB$ is a period of time in which the acceleration varies from the first threshold value A to the second threshold value B.

The road surface decision unit 62 decides, as a road surface state, a hard road surface H (first road state, refer to FIG. 7) and a soft road surface S (second road state, refer to FIG. 7) whose road surface state is softer than that of the hard road surface H. For example, although the hard road surface H is a road surface of hard soil, it may include a road surface of a paved road. The soft road surface S is a comparatively soft road surface, for example, like that of the sand of a desert or that of muddy ground.

The inventors of the present application have acquired such knowledge by performing test running of the motorcycle 1 that the variation time period $\Delta AB$ differs much between the hard road surface H and the soft road surface S. In particular, on the soft road surface S, the movement of the front forks 18 is slower than that on the hard road surface H, and on the soft road surface S, the variation time period $\Delta AB$ is longer than that on the hard road surface H. The road surface decision unit 62 in the present first embodiment decides the hard road surface H and the soft road surface S from the variation time period $\Delta AB$.

The road surface decision unit 62 generates, in a process for road surface decision control, a trigger (event) for road surface decision with reference to whether or not the variation time period $\Delta AB$ is within a predetermined time period p (not depicted). The predetermined time period p is, for example, 50 msec.

More particularly, in the case where the variation time period $\Delta AB$ is within the predetermined time period p, the road surface decision unit 62 generates a trigger of the hard road surface H. The road surface decision unit 62 counts the number of times of generation of a trigger of the hard road surface H.

In the case where the variation time period $\Delta AB$ is not within the predetermined time period p, namely, in the case where the variation time period $\Delta AB$ is longer than the predetermined time period p, the road surface decision unit 62 generates a trigger of the soft road surface S. The road surface decision unit 62 counts the number of times of generation of a trigger of the soft road surface S.

Figure 6:
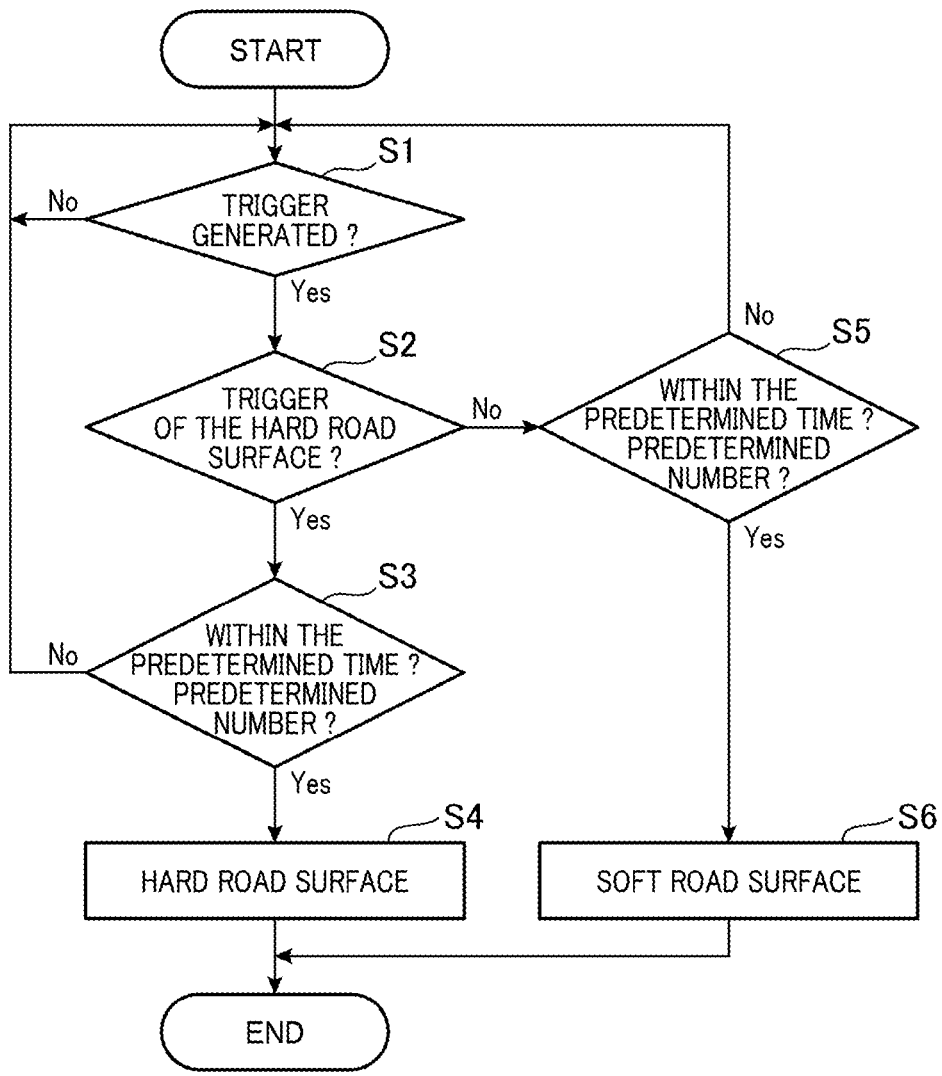
FIG. 6 is a flow chart depicting a process of road surface decision control.

FIG. 6 is a flow chart depicting a process for road surface decision control. The process for road surface decision control is executed repeatedly in a predetermined control cycle.

In the road surface decision control, the road surface decision unit 62 first acquires an acceleration from the acceleration sensor 50 and decides whether or not a trigger is generated (step S1).

In the case where a trigger is not generated (step S1: No), road surface decision unit 62 continues the detection of generation of a trigger.

On the other hand, in the case where a trigger is generated (step S1: Yes), if the trigger is a trigger of the hard road surface H (step S2: Yes), then the road surface decision unit 62 decides whether or not a trigger of the hard road surface H has been generated by a predetermined number of times within a predetermined decision time period after generation of a trigger of the hard road surface H for the first time (step S3). In the case where a trigger of the hard road surface H has been generated by the predetermined number of times within the predetermined decision time period after generation of a trigger of the hard road surface H for the first time (step S3: Yes), the road surface decision unit 62 decides that the road surface state is the hard road surface H (step S4) and transits to a hard mode. Here, the predetermined decision time period is, for example, three seconds (3000 msec), and the predetermined time number is, for example, 9 times.

In the hard mode, the suspension controlling unit 63 adjusts the motion characteristic of the front forks 18 to that suitable for the hard road surface H through the suspension adjustment mechanism 27.

In the case where a trigger of the hard road surface H has not been generated by the predetermined number of times within the predetermined decision time period after generation of a trigger of the hard road surface H for the first time (step S3: No), the road surface decision unit 62 resets the trigger and returns the processing to step S1 to continue the detection of generation of a trigger.

In the case where the detected trigger is not a trigger of the hard road surface H (step S2: No), namely, in the case where the detected trigger is a trigger of the soft road surface S, the road surface decision unit 62 decides whether or not a trigger of the soft road surface S has been generated by a predetermined number of times within a predetermined decision time period after generation of a trigger of the soft road surface S for the first time (step S5).

In the case where a trigger of the soft road surface S has been generated by the predetermined number of times within the predetermined decision time period after generation of a trigger of the soft road surface S for the first time (step S5: Yes), the road surface decision unit 62 decides that the road surface state is the soft road surface S (step S6) and transits to the soft mode. Here, the predetermined decision time period is, for example, three seconds, and the predetermined time number is, for example, 9 times.

In the soft mode described above, the suspension controlling unit 63 adjusts the motion characteristic of the front forks 18 to that suitable for the soft road surface S through the suspension adjustment mechanism 27.

In the case where a trigger of the soft road surface S has not been generated by the predetermined number of times within the predetermined decision time period after generation of a trigger of the soft road surface S for the first time (step S5: No), the road surface decision unit 62 resets the trigger and returns the processing to step S1 to continue the detection of generation of a trigger.

Figure 7:
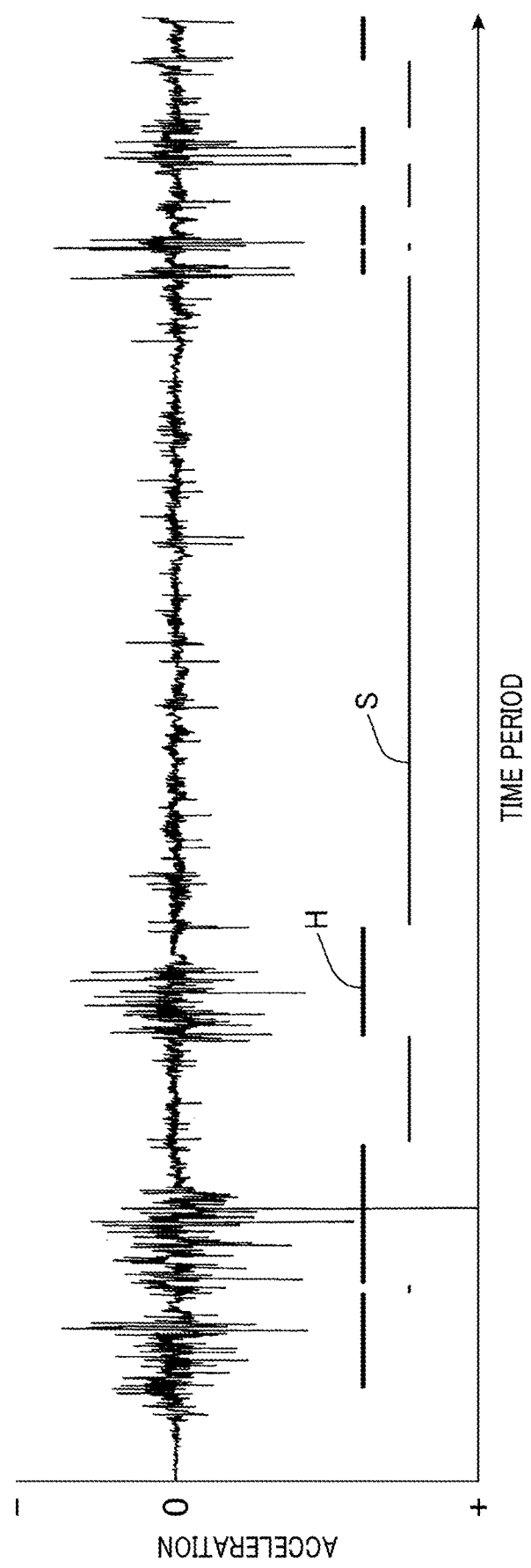
FIG. 7 is a graph depicting detection values of the acceleration and a result of road surface decision.

FIG. 7 is a graph indicative of detection values of the acceleration and a result of the road surface decision.

By the road surface decision control, the hard road surface H and the soft road surface S were successfully decided on the basis of the acceleration obtained from the acceleration sensor 50 as depicted in FIG. 7. On the hard road surface H, an acceleration higher than that on the soft road surface S is generated.

Figure 8:
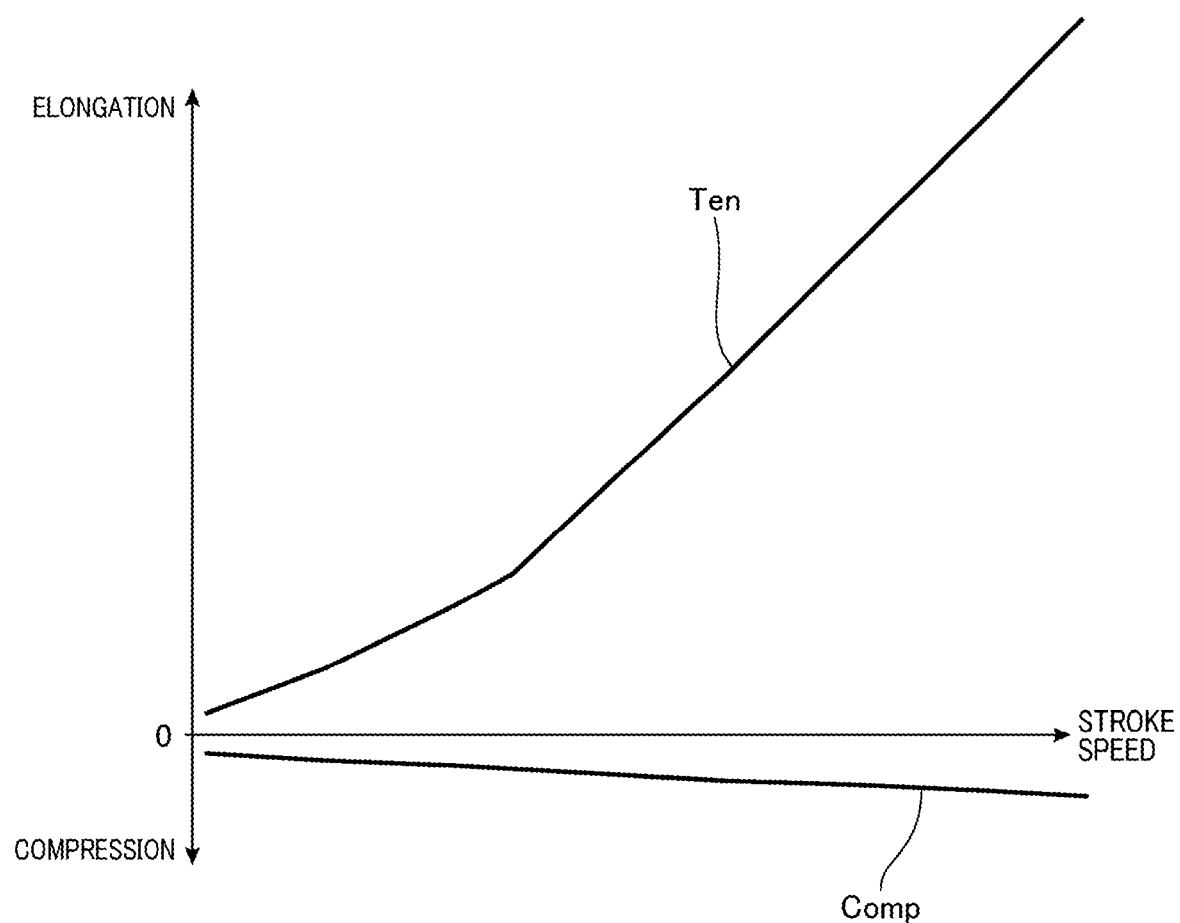
FIG. 8 is a graph depicting a damping characteristic of the front fork.

FIG. 8 is a graph depicting a damping characteristic of the front forks 18.

In FIG. 8, the axis of abscissa indicates the stroke speed of the front forks 18 and the axis of ordinate indicates the damping force.

The damping force Ten in the elongation direction is greater in increase rate of the damping force with respect to an increase of the stroke speed and higher also in maximum value of the damping force than the damping force Comp in the compression direction. Therefore, in the extension direction, the width of the acceleration occurring with the front forks 18 is greater, and the road surface state is liable to be reflected on the detection value of the acceleration.

In the present first embodiment, the variation time period $\Delta AB$ is a period of time required until the acceleration changes from the first threshold value A that is generated upon compression of the front forks 18 to the second threshold value B that is generated upon extension of the front forks 18. In other words, the variation time period $\Delta AB$ is a period of time on which both of the acceleration in the compression direction of the front forks 18 and the acceleration in the extension direction of the front forks 18 are reflected. The variation time period $\Delta AB$ includes a detection value in the extension direction of the front forks 18. Since the variation time period $\Delta AB$ is a period of time upon which the acceleration in the extension direction of the front forks 18 is reflected in this manner, by deciding the road surface state on the basis of the variation time period $\Delta AB$, the road surface state can be decided with a high degree of accuracy.

As described above, according to the first embodiment to which the present invention is applied, the motorcycle 1 includes a suspension that supports a front wheel 2 thereon, and a road surface state decision unit 62 that decides a road surface state by detection of an acceleration sensor 50. The acceleration sensor 50 is provided at a lower portion of the suspension and is capable of detecting an acceleration at least in a one-axis direction. The suspension is a front fork 18 that supports the front wheel 2 of the motorcycle 1. The front fork 18 includes a bottom case 30 that connects a lower portion of the front fork 18 and an axle 2a of the front wheel 2 to each other. The acceleration sensor 50 is attached to the bottom case 30.

According to the configuration just described, since the acceleration sensor 50 is attached to the bottom case 30 of the front fork 18 of the motorcycle 1, the acceleration sensor 50 can be provided in a simple structure and the acceleration acting upon the front wheel 2 can be detected effectively. Further, the road surface decision unit 62 can decide a state of the road surface with high accuracy from a detection value of the acceleration.

Further, the road surface state decision unit 62 decides a road surface state on the basis of a detection value in an extension direction of the front fork 18. Here, the detection value in the extension direction includes the variation time period $\Delta AB$ and the second threshold value B. Since the variation amount of the damping force with respect to the stroke of the front fork 18 in the extension direction of the front fork 18 is greater than that in the compression direction of the front fork 18, by deciding the road surface state from the acceleration in the extension direction, the road surface state can be decided with high accuracy.

Meanwhile, the motorcycle 1 includes a front fork 18 that supports a wheel 2 at a lower portion thereof, and a road surface state decision unit 62 that decides a road surface state by detection of an acceleration sensor 50. The acceleration sensor 50 is provided at the lower portion of the front fork 18 and is capable of detecting an acceleration at least in a one-axis direction. The road surface state decision unit 62 decides a road surface state based on a detection value in an extension direction of the front fork 18.

According to the configuration just described, since the acceleration sensor 50 is attached to the lower portion of the front fork 18, the acceleration sensor 50 can be provided in a simple structure and the acceleration acting upon the front wheel 2 can be detected effectively, and the road surface decision unit 62 can decide a state of the road surface with high accuracy from a detection value of the acceleration. Further, since the variation amount of the damping force with respect to the stroke of the front fork 18 in the extension direction of the front fork 18 is greater than that in the compression direction of the front fork 18, by deciding the road surface state from the acceleration in the extension direction, the road surface state can be decided with high accuracy.

Further, a brake caliper attachment hole 43c to which a brake caliper 37 for braking the wheel 2 is attached is provided in the bottom case 30, and the acceleration sensor 50 is fastened to the brake caliper attachment hole 43c together with the brake caliper 37. According to the configuration just described, a fixture for exclusive use for attaching the acceleration sensor 50 can be omitted and the number of parts can be reduced.

Furthermore, the acceleration sensor 50 is disposed between an axle 2a of the wheel 2 and the brake caliper 37 as viewed in side elevation of the vehicle. According to the configuration just described, the acceleration sensor 50 can be provided compactly utilizing the space between the axle 2a and the brake caliper 37, and the acceleration sensor 50 can be prevented from standing out and the appearance is good.

Further, the road surface state decision unit 62 is capable of deciding a hard road surface H and a soft road surface S that is softer in road surface state than the hard road surface H, and the road surface state decision unit 62 decides that the road surface state is the hard road surface H taking it as a trigger that a variation time period ΔAB after an acceleration reaches a first threshold value A until the acceleration reaches a second threshold value B that is lower than the first threshold value A is within a given time period.

According to the configuration just described, the hard road surface can be decided with high accuracy on the basis of the period of time in which the acceleration drops from the first threshold value A to the second threshold value B.

Further, the road surface state decision unit 62 decides that the road surface state is the soft road surface S taking it as a trigger that the variation time period ΔAB is longer than the given time period. According to the configuration just described, the soft road surface S can be decided with high accuracy on the basis of the period of time in which the acceleration drops from the first threshold value A to the second threshold value B.

Second Embodiment

In the following, a second embodiment to which the present invention is applied is described with reference to FIG. 9. In the present second embodiment, like elements to those in the first embodiment described hereinabove are denoted by like reference characters, and overlapping description of them is omitted herein.

The present second embodiment is different from the first embodiment described hereinabove in that an temporary mode I is provided between the decision of the soft road surface S and the decision of the hard road surface H and that a timer is set for the trigger.

Figure 9:
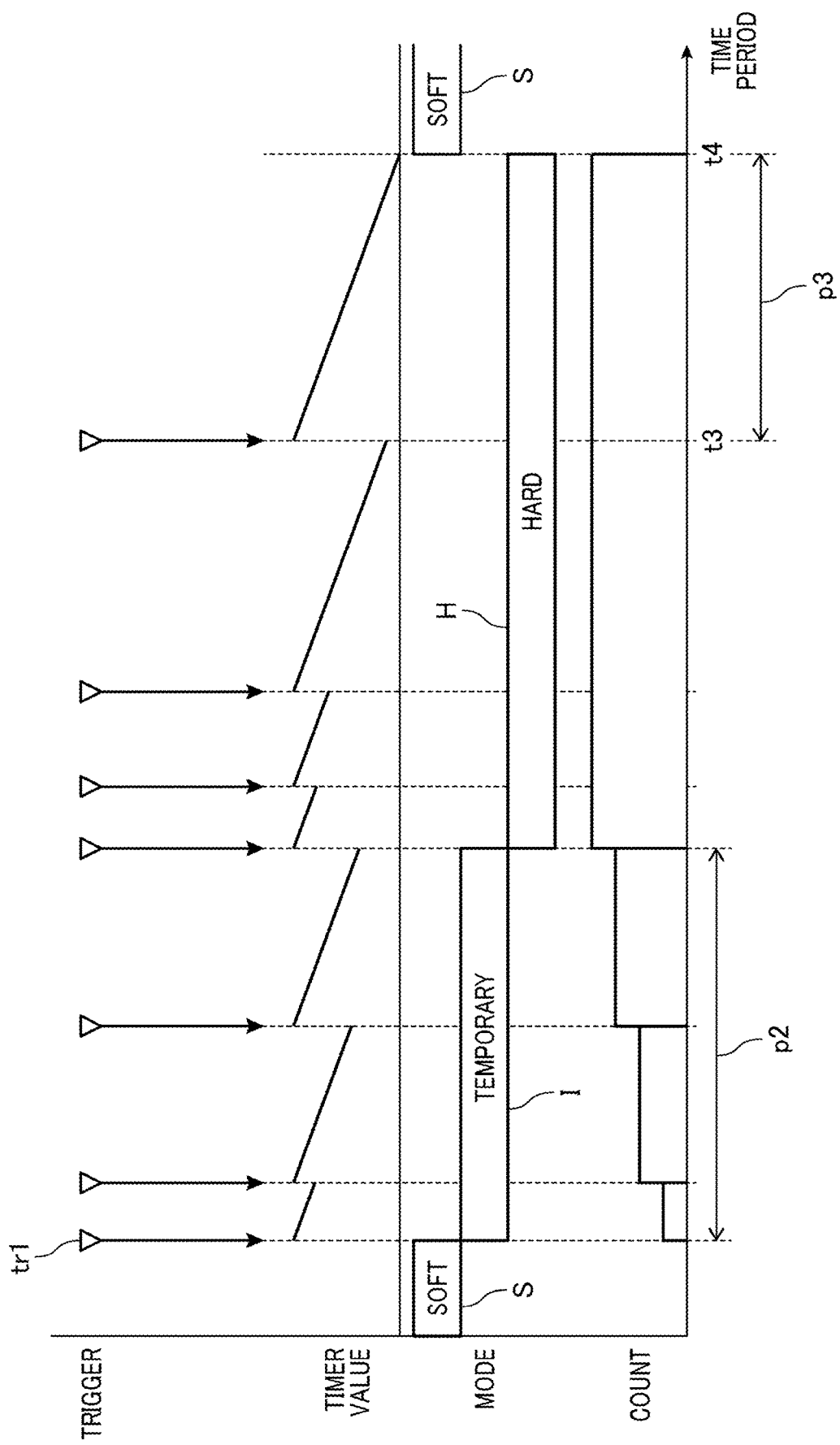
FIG. 9 is a graph depicting road surface decision of a second embodiment.

FIG. 9 is a graph depicting road surface decision of the second embodiment.

In FIG. 9, a relationship among a trigger of the hard road surface H, a timer value of the trigger, a mode for road surface decision and a count of the trigger is depicted.

When it is decided that the road surface state is the soft road surface S, if a trigger tr1 of the hard road face for the first time is generated, then the road surface decision unit 62 transits from the soft mode (decision of the soft road surface S) to the temporary mode I. In the temporary mode I, the road surface decision unit 62 decides that the road surface state is the hard road surface H, and the suspension controlling unit 63 controls the suspension adjustment mechanism 27 to adjust the motion characteristic of the front forks 18 so as to be suitable for the hard road surface H.

In the case where a trigger of the hard road surface H is generated by a predetermined number of times in a predetermined decision time period p2 (second predetermined time period) after generation of a trigger tr1 of the soft road surface S for the first time, the road surface decision unit 62 formally decides that the road surface state is the hard road surface H. Here, the predetermined decision time period p2 is, for example, one second (1000 msec), and the predetermined number of times is, for example, three times. In FIG. 9, the count of triggers in the predetermined decision time period p2 is totaling four.

In the case where a trigger of the hard road surface H is generated by a predetermined number of times in the predetermined decision time period p2 after generation of the trigger tr1 of the soft road surface S for the first time, the road surface decision unit 62 decides that the road surface state is the soft road surface S, and the suspension controlling unit 63 adjusts the motion characteristic of the front forks 18 to that suitable for the soft road surface S. In particular, the road surface decision unit 62 cancels the temporary mode I and returns to decision of the soft road surface S.

Further, in the case where it is decided that the road surface state is the hard road surface H, the road surface decision unit 62 resets the count of the timer every time a trigger of the hard road surface H is generated and then starts counting of the timer. If the count of the timer started at time t3 reaches a predetermined value at time t4, then the road surface decision unit 62 decides that the road surface state is the soft road surface S.

In particular, if a predetermined time period p3 elapses while a next trigger of the hard road surface H is not generated in the predetermined time period p3 (third predetermined time period) after a trigger of the hard road surface H is generated, then it is decided that the road surface state is the soft road surface S. The predetermined time period p3 is a period of time from time t3 to time t4.

It is to be noted that the timer counts also in the case where the decision of the hard road surface H in the temporary mode I continues.

As described above, according to the second embodiment to which the present invention is applied, where it is decided that the road surface state is the soft road surface S, the road surface state decision unit 62 transits to a temporary mode I if the trigger of the hard road surface H is detected. If the trigger of the hard road surface H is detected within a predetermined decision time period p2 after the transition to the temporary mode I, then the road surface state decision unit 62 decides that the road surface state is the hard road surface H, but if the trigger of the hard road surface H is not detected within the predetermined decision time period p2 after the transition to the temporary mode I, then the road surface state decision unit 62 decides that the road surface state is the soft road surface S. Further, in the temporary mode I, the road surface state decision unit 62 decides that the road surface state is the hard road surface H. According to the configuration just described, if a trigger tr1 of the hard road surface H is detected, then the road surface decision unit 62 transits to the temporary mode I and, in the temporary mode I, it is decided that the road surface state is the hard road surface H. Therefore, the road surface decision unit 62 can transit rapidly from the decision of the soft road surface S to the decision of the hard road surface H. Then, if a trigger of the hard road surface H is not detected in the predetermined decision time period p2 after the transition to the temporary mode I, then the road surface decision unit 62 returns to the decision for the soft road surface S, and therefore, the road surface decision unit 62 can return to decision of the soft road surface S rapidly in response to an actual road surface state.

It is to be noted that the temporary mode I may be applied to decision of the soft road surface S. In particular, where it is decided that the road surface state is the hard road surface H, the road surface state decision unit 62 transits to the temporary mode I if the trigger of the soft road surface S is detected. If the trigger of the soft road surface S is detected within a predetermined decision time period p2 after the transition to the temporary mode I, then the road surface state decision unit 62 decides that the road surface state is the soft road surface S, but if the trigger of the soft road surface S is not detected within the predetermined decision time period p2 after the transition to the temporary mode I, then the road surface state decision unit 62 decides that the road surface state is the hard road surface H. Further, in the temporary mode I, the road surface state decision unit 62 decides that the road surface state is the soft road surface S.

Furthermore, if a third given time period p3 elapses after the trigger of the hard road surface H is detected, then the road surface state decision unit 62 decides that the road surface state is the soft road surface S. According to the configuration just described, the road surface decision unit 62 can return from the decision of the hard road surface H to the decision of the soft road surface S rapidly, and it can be suppressed that, in the case where the actual road surface state is the soft road surface S, the decision by the road surface decision unit 62 changes to the decision for the hard road surface H.

It is to be noted that, if, in the case where it is decided that the road surface state is the soft road surface S, the predetermined time period p3 elapses after a trigger of the soft road surface S is detected, then the road surface decision unit 62 may decide that the road surface state is the hard road surface H.

Further, where it is decided that the road surface state is the hard road surface H, every time the trigger of the hard road surface H is detected, the road surface state decision unit 62 resets a count of a timer and starts counting of the timer, and if the count of the timer reaches a predetermined value, then the road surface state decision unit 62 decides that the road surface state is the soft road surface S. According to the configuration just described, since the decision of the hard road surface is maintained until after the count of the timer reaches the predetermined value, the decision of the hard road surface H can be maintained appropriately. Further, since, if the count of the timer reaches the predetermined value, then it is decided that the road surface state is the soft road surface S, the road surface decision unit 62 can return from the decision of the hard road surface H to the decision of the soft road surface S rapidly in response to an actual road surface state.

It is to be noted that, in the case where it is decided that the road surface state is the soft road surface S, every time a trigger of the soft road surface S is detected, the road surface decision unit 62 may reset the count of the timer and start counting of the timer, and when the count reaches the predetermined value, the road surface decision unit 62 may decide that the road surface state is the hard road surface H.

It is to be noted that the embodiments described above indicates a mode to which the present invention is applied, and the present invention is not limited to the first and second embodiments.

Although, in the foregoing description of the first and second embodiment, the motorcycle 1 is taken as an example of the vehicle, the present invention is not limited to this and can be applied to such vehicles as a three-wheeled saddle riding vehicle having two front wheels or two rear wheels, a saddle riding vehicle including four or more wheels and ordinary four-wheeled vehicles. In the case where the present invention is applied to vehicles such as four-wheeled vehicles, the acceleration sensor 50 may be provided at a portion of a lower portion of a suspension that moves in response to displacement of the wheel.

DESCRIPTION OF REFERENCE SYMBOLS

1 Motorcycle (vehicle, saddle riding vehicle)
2 Front wheel (wheel)
2a Axle
18, 18 Front fork (suspension)
30 Bottom case
37 Brake caliper
43c, 43c Attachment hole (brake caliper attachment hole)
50 Acceleration sensor (sensor)
62 Road surface decision unit
A First threshold value
B Second threshold value
H Hard road surface
I Temporary mode
S Soft road surface
p2 Predetermined decision time period (second predetermined time period)
p3 Predetermined time period (third predetermined time period)
ΔAB Variation time period

The invention claimed is:
1. A vehicle, comprising:
a suspension that supports a front wheel thereon; and
a processor that functions as a road surface state decision unit that decides a road surface state by detection of a sensor, wherein
the sensor is provided at a lower portion of the suspension and is capable of detecting an acceleration at least in a one-axis direction,
the suspension is a front fork that support the front wheel of the vehicle, which is a saddle riding vehicle,
the front fork incudes a bottom case linking the lower portion of the front fork and an axle of the wheel,
a brake caliper for braking the wheel is disposed behind the axle and fixed to the bottom case,
wherein the sensor includes a sensor main body portion for detecting an acceleration and a bracket portion that supports the sensor main body portion, the bracket portion is fixed to the bottom case at a position between the axle of the wheel and the brake caliper as viewed in side elevation of the vehicle, the bottom case includes an upper side caliper stay that extends rearwardly and a lower side caliper stay that extends rearward of the bottom case at a lower side of the upper side caliper stay, the brake caliper is fixed to the upper side caliper stay and the lower side caliper stay, the bracket portion is disposed on an outer side face, in a vehicle widthwise direction, of the upper side caliper stay and on an outer side face, in the vehicle widthwise direction, of the lower side caliper stay, the bracket portion connects the upper side caliper stay and the lower side caliper stay in an upward and downward direction, the sensor main body portion is fixed to an inner side face, in the vehicle widthwise direction, of the bracket portion, and is positioned forwardly of the brake caliper and between the upper side caliper stay and the lower side caliper stay, the sensor main body portion is surrounded by the brake caliper, the upper side caliper stay, the lower side caliper stay, and the bracket portion from both sides of the vehicle upward-downward direction and both sides of the vehicle width direction.

2. The vehicle according to claim 1, wherein the attachment hole to which the sensor is attached is a brake caliper attachment hole to which the brake caliper is attached, and the sensor is fastened to the brake caliper attachment hole together with the brake caliper.

3. The vehicle according to claim 1, wherein the road surface state decision unit decides a road surface state based on a detection value in an extension direction of the suspension.

4. The vehicle according to claim 3, wherein
the road surface state decision unit is capable of deciding a hard road surface and a soft road surface that is softer in road surface state than the hard road surface; and the road surface state decision unit decides that the road surface state is the hard road surface taking it as a trigger that a variation time period after an acceleration reaches a first threshold value until the acceleration reaches a second threshold value that is lower than the first threshold value is within a given time period.

5. The vehicle according to claim 4, wherein the road surface state decision unit decides that the road surface state is the soft road surface taking it as a trigger that the variation time period is longer than the given time period.

6. The vehicle according to claim 4, wherein,
where it is decided that the road surface state is the soft road surface, the road surface state decision unit transits to a temporary mode if the trigger of the hard road surface is detected;

if the trigger of the hard road surface is detected within a second given time period after the transition to the temporary mode, then the road surface state decision unit decides that the road surface state is the hard road surface, but if the trigger of the hard road surface is not detected within the second given time period after the transition to the temporary mode, then the road surface state decision unit decides that the road surface state is the soft road surface; and, in the temporary mode, the road surface state decision unit decides that the road surface state is the hard road surface.

7. The vehicle according to claim 4, wherein, if a third given time period elapses after the trigger of the hard road surface is detected, then the road surface state decision unit decides that the road surface state is the soft road surface.

8. The vehicle according to claim 4, wherein, where it is decided that the road surface state is the hard road surface, every time the trigger of the hard road surface is detected, the road surface state decision unit resets a count of a timer and starts counting of the timer, and if the count of the timer reaches a given value, then the road surface state decision unit decides that the road surface state is the soft road surface.

* * * * *